J. SEGERC.
VEGETABLE CUTTER.
APPLICATION FILED MAY 12, 1915.

1,155,762.

Patented Oct. 5, 1915.
5 SHEETS—SHEET 1.

WITNESS

INVENTOR
J. Segerc
BY
his ATTORNEY

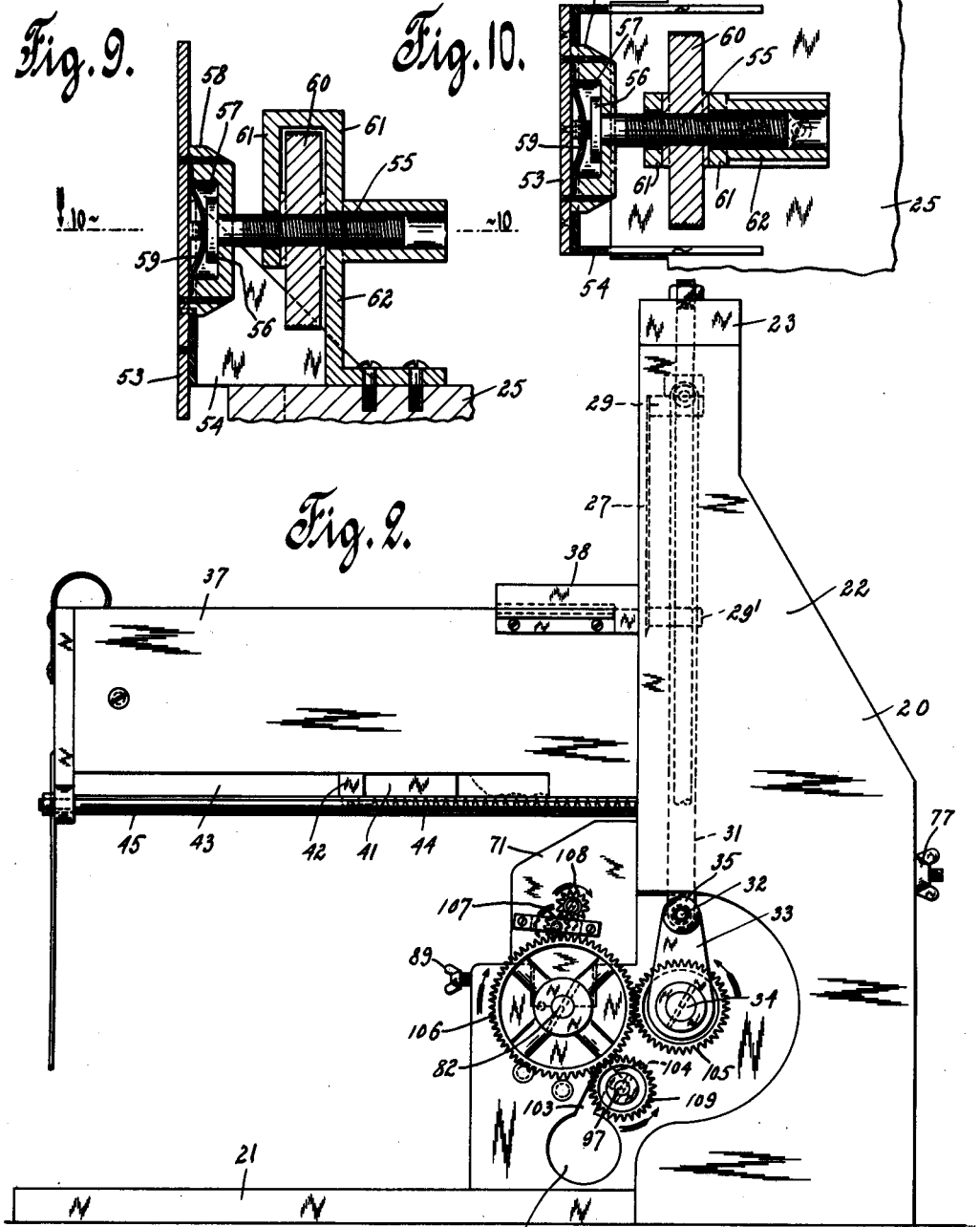

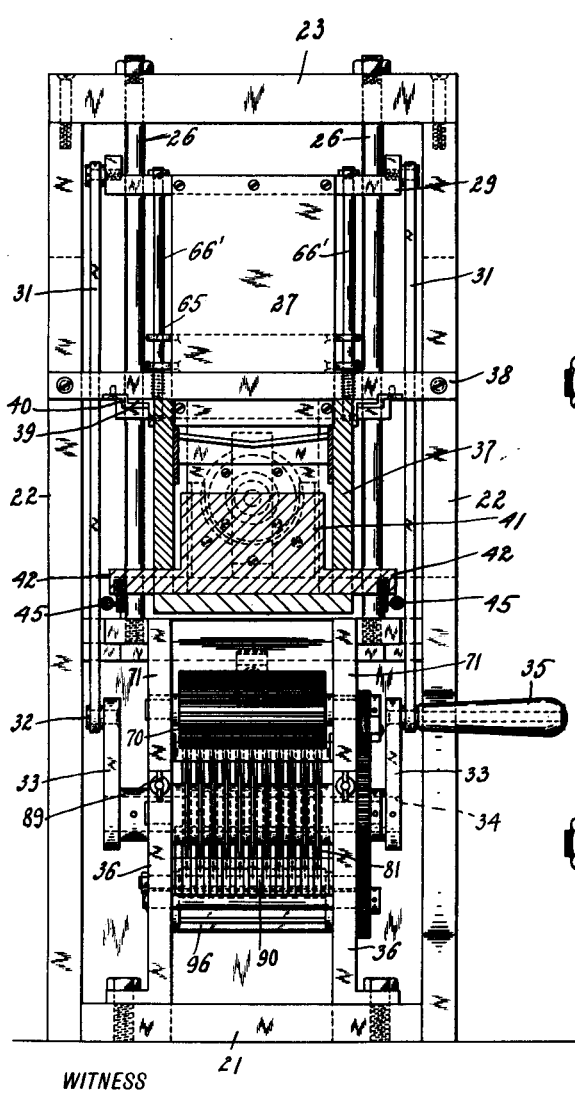
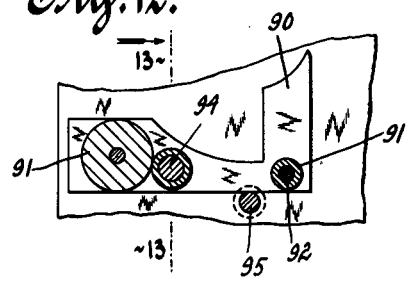
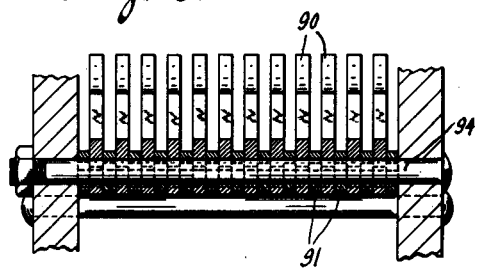
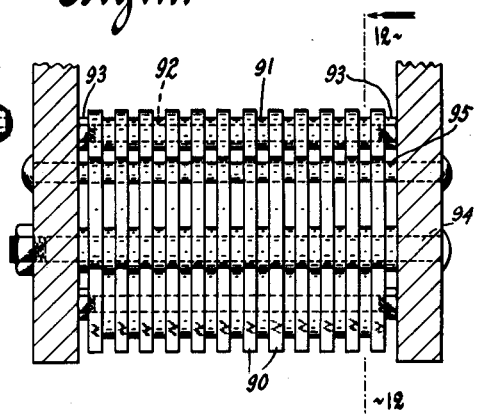

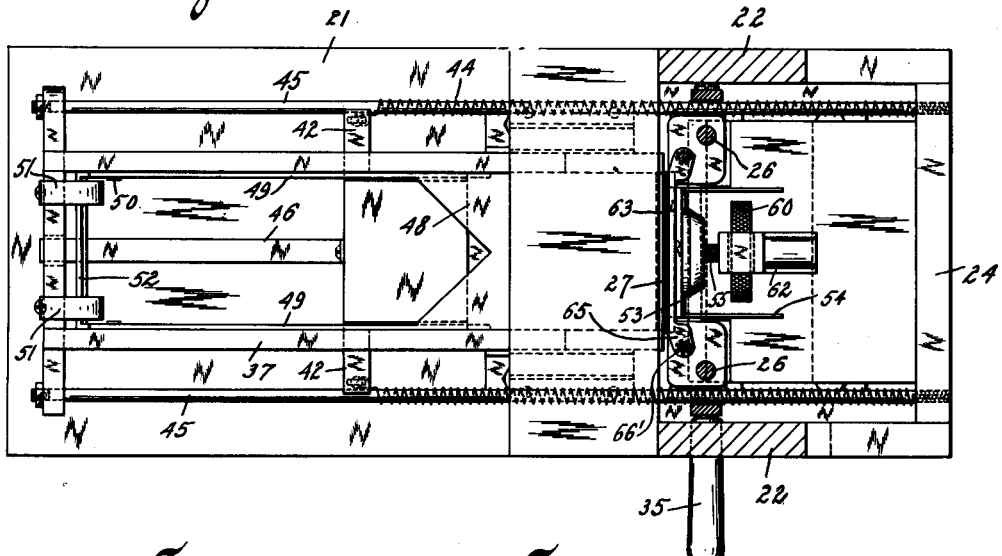

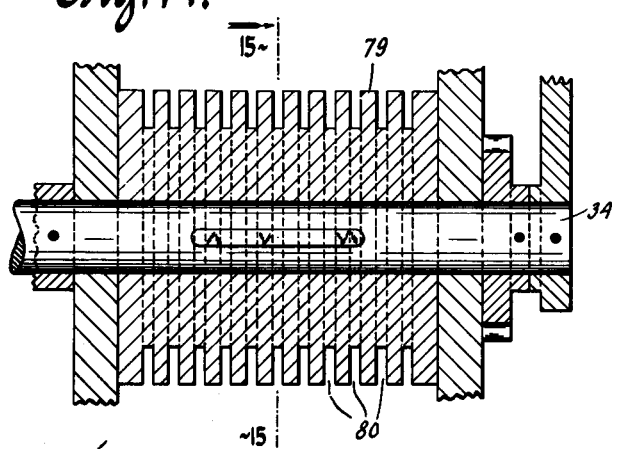
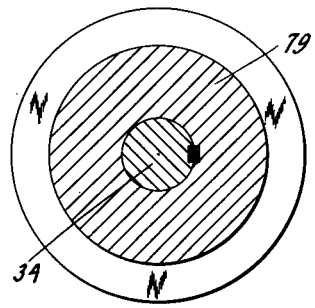
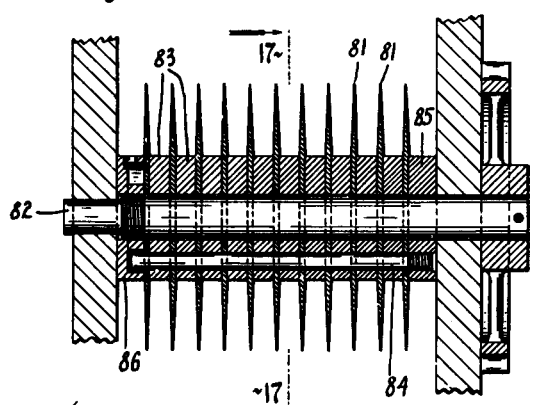
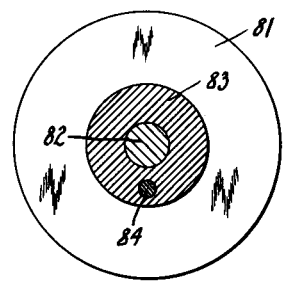
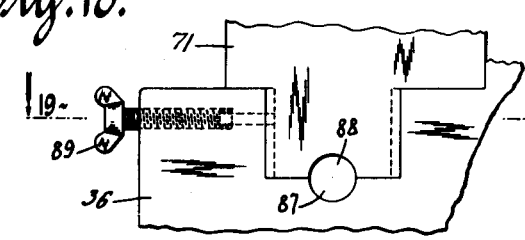
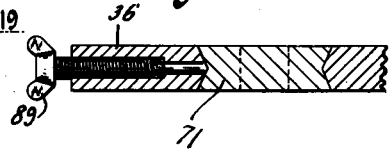

UNITED STATES PATENT OFFICE.

JOSEPH SEGERC, OF NEW YORK, N. Y.

VEGETABLE-CUTTER.

1,155,762.  Specification of Letters Patent.  Patented Oct. 5, 1915.

Application filed May 12, 1915. Serial No. 27,520.

*To all whom it may concern:*

Be it known that I, JOSEPH SEGERC, a subject of the King of Hungary, and a resident of the city of New York, in the county of New York and State of New York, have invented certain new and useful Improvements in Vegetable-Cutters, of which the following is a specification.

The present invention relates to vegetable cutters for slicing and cutting, for instance, potatoes, carrots, etc.

One of the objects of the invention is to produce a machine of this type which combines three apparatus in one, more particularly a slicing machine, a device for dividing the slices into strips, and a contrivance for subdividing the strips, for instance, into blocks.

Another object of the invention is to provide a device of this character which is simple in construction, efficient in operation, and which can be easily adjusted to predetermine the thickness of the slices, the width of the strips and the length of the blocks to be cut.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 4:
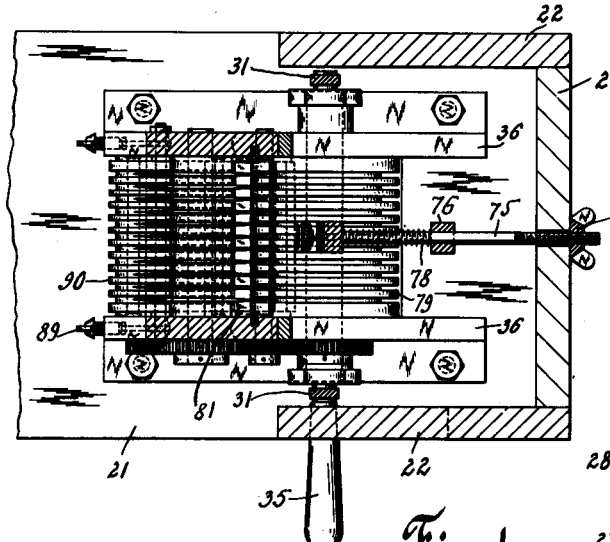
Figure 1:
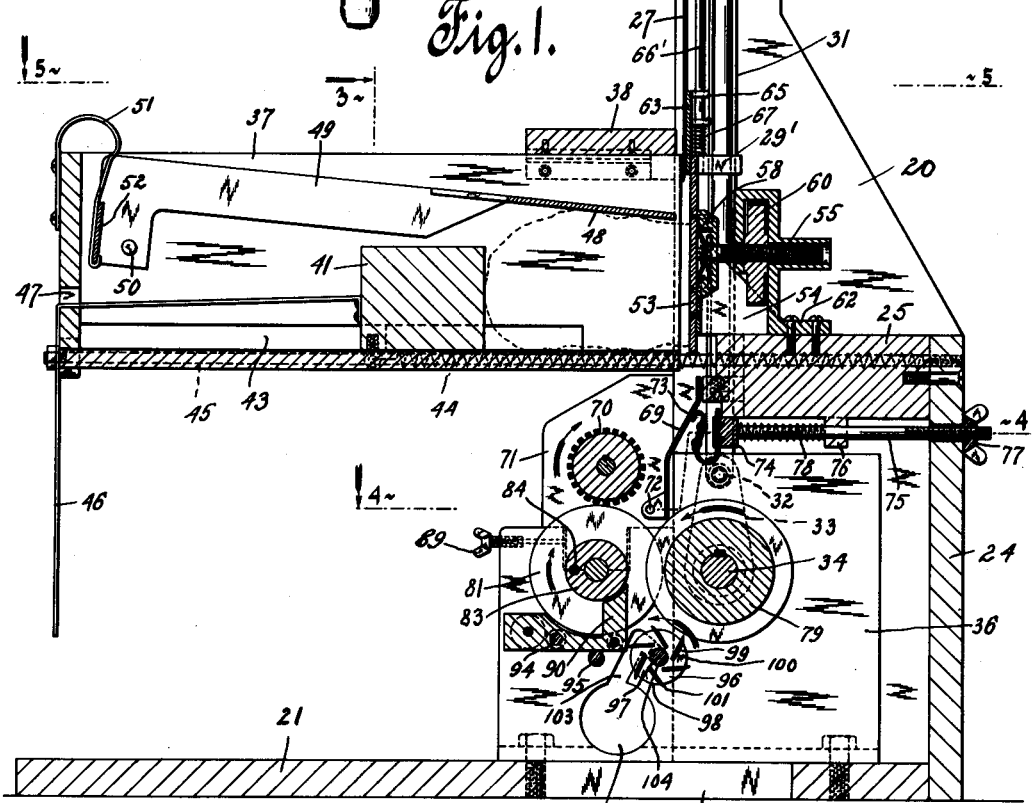

Figure 1 is a central vertical section taken through a vegetable cutter constructed in accordance with the present invention; Fig. 2 is a side elevation of the same; Fig. 3 is a section taken on line 3—3 of Fig. 1; Fig. 4 is a section taken on line 4—4 of Fig. 1; Fig. 5 is a section taken on line 5—5 of Fig. 1; Fig. 6 is a rear elevation of the slicing knife with its appurtenances; Fig. 7 is a section taken on line 7—7 of Fig. 6; Fig. 8 is a section taken on line 8—8 of Fig. 6; Fig. 9 is a central vertical section taken through the means for predetermining the thickness of the slices to be cut; Fig. 10; is a section taken on line 10—10 of Fig. 9; Fig. 11 is a plan view of the stripping means coacting with the strip cutting knives; Fig. 12 is a section taken on line 12—12 of Fig. 11; Fig. 13 is a section taken on line 13—13 of Fig. 12; Fig. 14 is a vertical section taken through a platen coöperating with the strip cutting knives; Fig. 15 is a section taken on line 15—15 of Fig. 14; Fig. 16 is a vertical section taken through the strip cutting knives; Fig. 17 is a section taken on line 17—17 of Fig. 16; Fig. 18 is a side elevation of a detail of a bearing of the machine; and Fig. 19 is a section taken on line 19—19 of Fig. 18.

In the drawings, the numeral 20 indicates the main frame of the machine, comprising a base plate 21, to which are attached side members 22, that are connected by a top plate 23 and a rear plate 24. A suitable distance above the base plate 21 is disposed a horizontally extending support 25, that is attached in any suitable manner to the rear plate 24, but does not extend throughout the width of the same, as clearly shown in Figs. 3 and 5 of the drawings. To this support and to the top plate 23 are fastened two parallel vertically extending guide rods 26 for the reciprocating slicing knife 27. This knife comprises a blade which is fastened, for instance by screws 28, to a reciprocable head 29, having apertures 30, in which are seated the guide rods 26. Apertured lugs 29' upon the blade engage also the said guide rods. The head is connected by pitmen 31 with the wrist-pins 32 of cranks 33, the latter being keyed or otherwise rigidly attached to the main driving shaft 34 of the apparatus. One of the wrist-pins 32 is provided with an actuating handle 35, by means of which rotation may be imparted manually to the main driving shaft. The main driving shaft is journaled in two vertically extending frame sections 36, which are disposed parallel to the side members 22 of the main frame, and are bolted to the base plate 21.

The vegetables to be cut are placed into a box-like hopper 37, which is detachably held upon a transverse rail 38, the latter being attached to the side members 22 of the main frame. The means for attaching the hopper to the transverse rail comprises, for instance, two angle-iron strips 39 upon the hopper, resting upon similar strips 40, which are secured to the underface of the transverse rail 38. Within the hopper is disposed a follower 41, having lugs 42 projecting through longitudinal slots 43 in the sides of the hopper, said lugs being engaged by springs 44, that are wound upon rods 45. These rods are located parallel to the bottom of the hopper, and are secured to the front of the latter and to the rear plate 24 of the main frame. The other ends of the springs 44 are fastened to those ends of the rods 45 which are engaged with the said rear plate. A flexible band 46, secured to the follower 41, projects through an aperture 47 in the front wall of the hopper and serves as a means by which the follower may be drawn against the action of its springs toward the front wall of the hopper when the vegetables are to be placed into the same. The vegetables are forced onto the bottom of the hopper by a presser foot 48, that is carried by levers 49, the latter being pivoted at 50 to the sides of the hopper. Springs 51, attached to the front wall of the hopper and bearing against a transverse bar 52 that connects the levers 49, have a tendency to force the presser foot against the bottom of the hopper. The material to be cut is fed by the follower 41 toward and against a stop 53, made in the form of a vertically disposed plate and arranged in rear of the cutter 27. The stop is attached to two brackets 54, which rest upon the support 25, said brackets, together with the stop, being shiftable upon the support. The means for shifting the stop comprises a screw threaded spindle 55, having upon its inner end a head 56 disposed within a recess 57 in a block 58, the latter being fixedly attached to the stop 53. Springs 59 within the recess, bearing against the head 56, permit of a limited movement of the stop in the direction of the longitudinal axis of and in relation to the spindle 55. With the spindle coöperates a nut 60, that is held between two vertical portions 61 of a standard 62, in which the said spindle is rotatably journaled. The standard 62 is fastened to the support 25. By means of this arrangement the distance between the rear face of the slicing knife and the stop can be adjusted according to the requirements, the purpose of the adjustment being to predetermine the thickness of the slices to be cut. With the slicing knife coöperates a stripper 63. This stripper comprises a plate member 64, that is slidably disposed upon the rear face of the said knife. For this purpose the said plate member is provided with ears 65, having holes 66 in which are seated vertical stationary rods 66', that are secured to the head 29 and to the lugs 29' above described. Springs 67, coiled upon the rods 66' and attached to the ears 65 and to the lugs 29', serve to draw the stripper 63 toward the cutting edge 68 of the slicing knife.

The cut slices are guided by a curved, spring-pressed rigid sheet 69 within the reach of a feeding roller 70. The feeding roller is corrugated upon its periphery, its journals being rotatably mounted in detachable portions 71 of the frame sections 36. The sheet 69 is pivoted at 72 to the portions 71 of the said frame sections, and against its rear face bears a blade spring 73, carried by a block 74, the latter being fixedly attached to a horizontally extending spindle 75, that is rotatably mounted in a projection 76 upon the underface of the support 25 and in the rear plate 24. The rear end of the spindle 75 is screw threaded and in engagement with a wing-nut 77, that bears against the back face of the rear plate 24. A spring 78, coiled upon the spindle 75 and bearing against the projection 76 and the block 74, tends to force the blade spring 73 against the rigid sheet 69. The pressure which the spring 73 exerts upon the said rigid sheet may be adjusted by turning the nut 77 in one or the other direction, as required.

The feeding roller 70 causes the slices to pass onto a platen 79 in the form of a cylinder, that is fixedly attached to the main driving shaft of the machine. This platen is provided with peripheral annular recesses 80, which are disposed equidistantly and parallel to each other. With the platen coöperates a plurality of disk cutters 81, mounted in any suitable manner upon a spindle 82. The disk cutters are equidistantly disposed on the said spindle and extend into the annular recesses 80 in the platen. The platen and disk cutters rotate in opposite directions, as indicated by the arrows shown in Fig. 1 of the drawings, whereby the slices are cut into strips. The disk cutters are spaced apart by washers 83 upon the spindle, through the said washers and disk cutters extending a pin 84 to cause the said cutters to rotate together. One of the washers, denoted by the numeral 85, is fixedly attached to the spindle, and another one, denoted by the numeral 86, is screwed onto the spindle 82, whereby, upon unscrewing the last named washer, the disk cutters and washers, with the exception of that indicated by the numeral 85, can be removed from the said spindle. This becomes necessary if the widths of the strips to be cut are to be varied. For this purpose the washers are to be replaced by thicker ones, care being taken, however, that the disk cutters should be disposed in such a manner upon the spindle that they are seated, when assembled, in recesses 80 in the platen. The spindle 82 is journaled in the frame sections 36, which are for this purpose provided below the detachable portions 71 with the semi-circular notches 87, forming each one-half of a bearing, the other halves being formed by semi-circular notches 88 in the detachable portions 71. The said detachable portions 71 are held upon the frame sections 36 by clamping screws 89.

The strips cut are removed from the spaces between the disk cutters by strippers 90. These strippers are made in the form of suitably shaped plates, which project into the spaces between the several disk knives, and are spaced apart by blocks 91, through the said blocks and plates passing spindles 92, the ends of which are screw threaded and in engagement with nuts 93, whereby the said elements are clamped together so as to form an integral whole. The strippers are pivoted at 94 to the frame sections 36, and rest upon a support 95 in the form of a rod, that is carried by the said frame sections. It is obvious that, when the distances between the disk knives are adjusted for varying the widths of the strips to be cut, the strippers have to be adjusted also in order to properly coöperate with the said knives.

The vegetable strips are subdivided into blocks by a cutter 96, comprising a shaft 97, that is journaled in the frame sections 36, and has rigidly attached thereto two heads 98, provided with slots 99, in which are fixedly held blades 100, having their cutting edges 101 disposed beyond the peripheries of said heads. This cutter rotates in a direction opposite to that of the disk knives and subdivides the strips into blocks. The cutter 96 is removably mounted on the machine, and for this purpose there are provided in the frame sections 36 circular apertures 102, from which lead slots 103 to downwardly inclined slots 104, the latter forming bearings for the said cutters. The diameters of the openings 102 are obviously greater than that of the cutter 96. The cut vegetable blocks fall through an opening 21' in the base plate 20 into a container or receptacle, placed below the said base plate.

The several rotating elements of the machine are geared together in the following manner: To the main driving shaft 34 is keyed a gear 105, in mesh with a gear 106, that is rigidly attached to the spindle 82 of the disk knives. The gear 106 meshes with an idler 107, that is rotatably journaled in the portion 71 of one of the frame sections 36, and meshes with a pinion 108, that is fixedly attached to one of the journals of the feed roller 70. The gear 106 meshes furthermore with a pinion 109 upon the shaft 97 of the cutter 96.

The operation of this device is as follows: If it is intended to divide the vegetables into blocks, the machine is assembled as shown in Figs. 1, 2 and 3 of the drawings. The vegetables are placed into the hopper, the presser foot 48 forcing them against the bottom of the hopper, and the follower 41 causing them to move toward the stop 53. This stop is, of course, previously adjusted to predetermine the thickness of the slices to be cut, the widths of the strips being predetermined by the relative positions of the several disk knives, and the lengths of the blocks by the distances between the blades of the cutters 96. By rotating the main driving shaft 34, the slicer 27 is reciprocated, slicing the vegetables. These slices are then delivered within the reach of the strip cutter, and the strips from there to the block cutter.

If it is intended to cut the material into slices only, the strip cutter and block cutter are removed from the machine. If, on the other hand, the slices are to be subdivided into strips only, the block cutter 96 is taken off the machine.

From this it appears that the machine herein described performs the work of three separate machines, that is to say it can be used as a slicer, as a strip cutter, and as a block cutter.

What I claim is:—

1. In a vegetable cutter, the combination with a hopper, of a slicing knife coöperating therewith, a cylindrical platen, a plurality of rotating disk knives mounted upon a common shaft coacting with said platen, said disk knives being spaced apart to cut the slices into strips, a feeding roller for advancing the slices received from said hopper onto said platen, and guiding means for bringing the slices within the reach of said roller.

2. In a vegetable cutter, the combination with a hopper, of a slicing knife coöperating therewith, a cylindrical platen, a plurality of rotating disk knives mounted upon a common shaft coacting with said platen, said disk knives being spaced apart to cut the slices into strips, means for feeding the slices received from said hopper onto said platen, a stripper associated with said disk knives, and a rotary cutter for subdividing the strips as they pass said stripper into blocks.

3. In a vegetable cutter, the combination with a hopper, of a slicing knife coöperating therewith, a cylindrical platen, a plurality of rotating disk knives mounted upon a common shaft coacting with said platen, said disk knives being spaced apart to cut the slices into strips, a feeding roller for advancing the slices received from said hopper onto said platen, guiding means for bringing the slices within the reach of said roller, a stripper associated with said disk knives, and a rotary cutter for subdividing the strips as they pass said stripper into blocks.

Signed at New York, in the county of New York, and State of New York, this 12th day of April, A. D. 1915.

JOSEPH SEGERC.